United States Patent [19]

Leonard et al.

[11] Patent Number: 5,073,064
[45] Date of Patent: Dec. 17, 1991

[54] METHOD AND APPARATUS FOR RETORQUING AN INSTALLED MINE ROOF BOLT

[75] Inventors: Henry A. Leonard, Birmingham, Ala.; Charles W. Schaffer, Lebanon, Pa.

[73] Assignee: Birmingham Bolt Company, Birmingham, Ala.

[21] Appl. No.: 515,838

[22] Filed: Apr. 27, 1990

[51] Int. Cl.$^5$ ............................................. E21D 20/02
[52] U.S. Cl. ................................ 405/259.6; 405/259.1
[58] Field of Search ......... 405/261, 260, 259, DIG. 1, 405/DIG. 2, DIG. 4

[56] References Cited

U.S. PATENT DOCUMENTS

| | | | |
|---|---|---|---|
| 3,702,060 | 11/1972 | Cumming | 405/261 |
| 3,896,627 | 7/1975 | Brown | 405/261 |
| 4,033,380 | 7/1977 | Weber . | |
| 4,179,861 | 12/1979 | Brown . | |
| 4,187,040 | 2/1980 | Donan, Jr. . | |
| 4,347,020 | 8/1982 | White et al. . | |
| 4,362,440 | 12/1982 | Glaesmann et al. . | |
| 4,400,113 | 8/1983 | Chaiko et al. | 405/261 |
| 4,413,930 | 11/1983 | Calandra, Jr. . | |
| 4,556,344 | 12/1985 | White . | |
| 4,664,561 | 5/1987 | Frease . | |
| 4,757,595 | 7/1988 | Fraering, Jr. . | |
| 4,784,530 | 11/1988 | Price, Jr. | 405/261 X |
| 4,840,524 | 6/1989 | Bisping et al. . | |

Primary Examiner—Dennis L. Taylor
Assistant Examiner—J. Russell McBee
Attorney, Agent, or Firm—Shlesinger, Arkwright & Garvey

[57] ABSTRACT

An anchor assembly for installing a threaded roof bolt under tension in a bore hole formed in underground passageways, mines, and the like. The anchor assembly includes a conventional two compartment resin cartridge and a mechanical expansion unit. A support collar is threaded on the bolt to restrict axial movement of the mechanical expansion unit. The mechanical expansion unit includes a camming plug and an expandable shell. A pair of hollow tubular sleeves are positioned intermediate the camming plug and the support collar to prevent the resin from embedding in the grooves of the threads of the bolt. Accordingly, the bolt is free to rotate relative to the substrate.

23 Claims, 3 Drawing Sheets

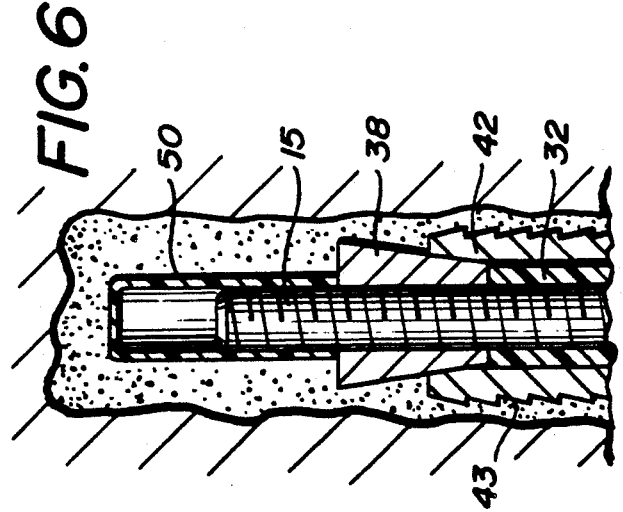
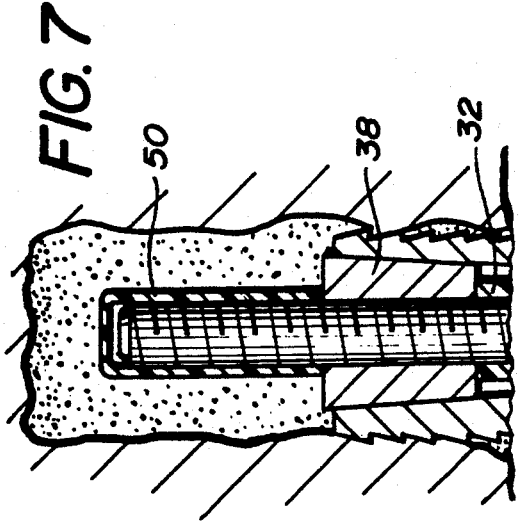
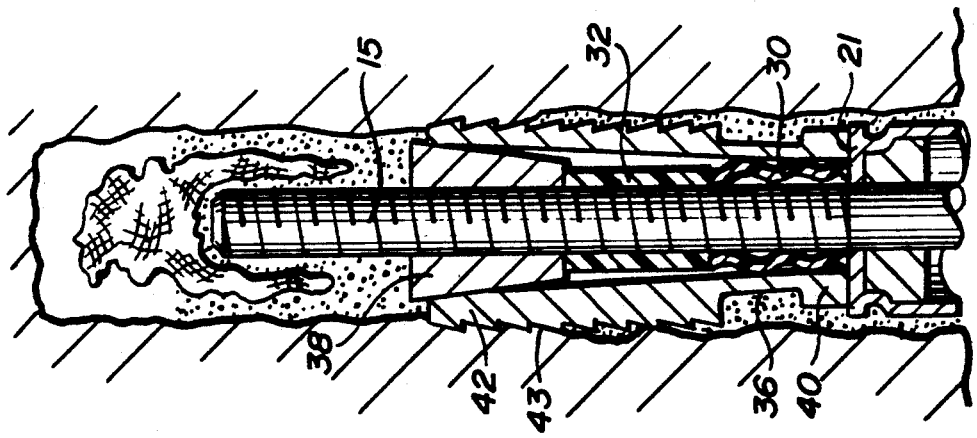
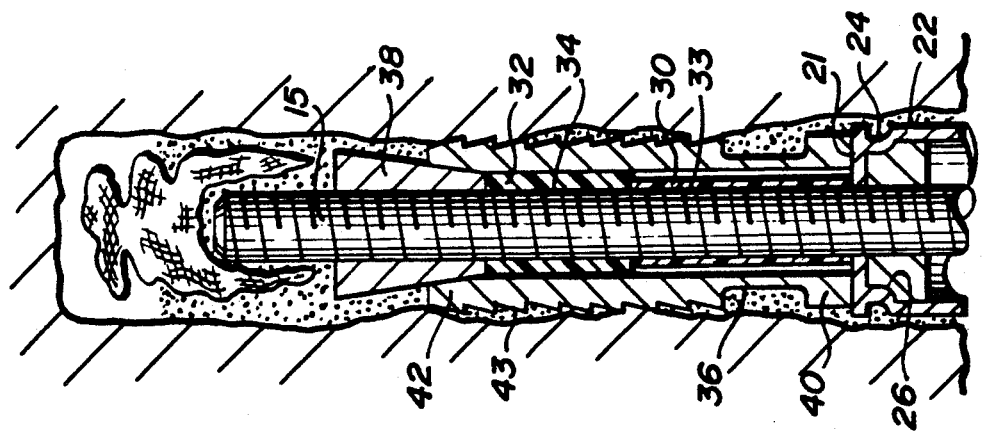

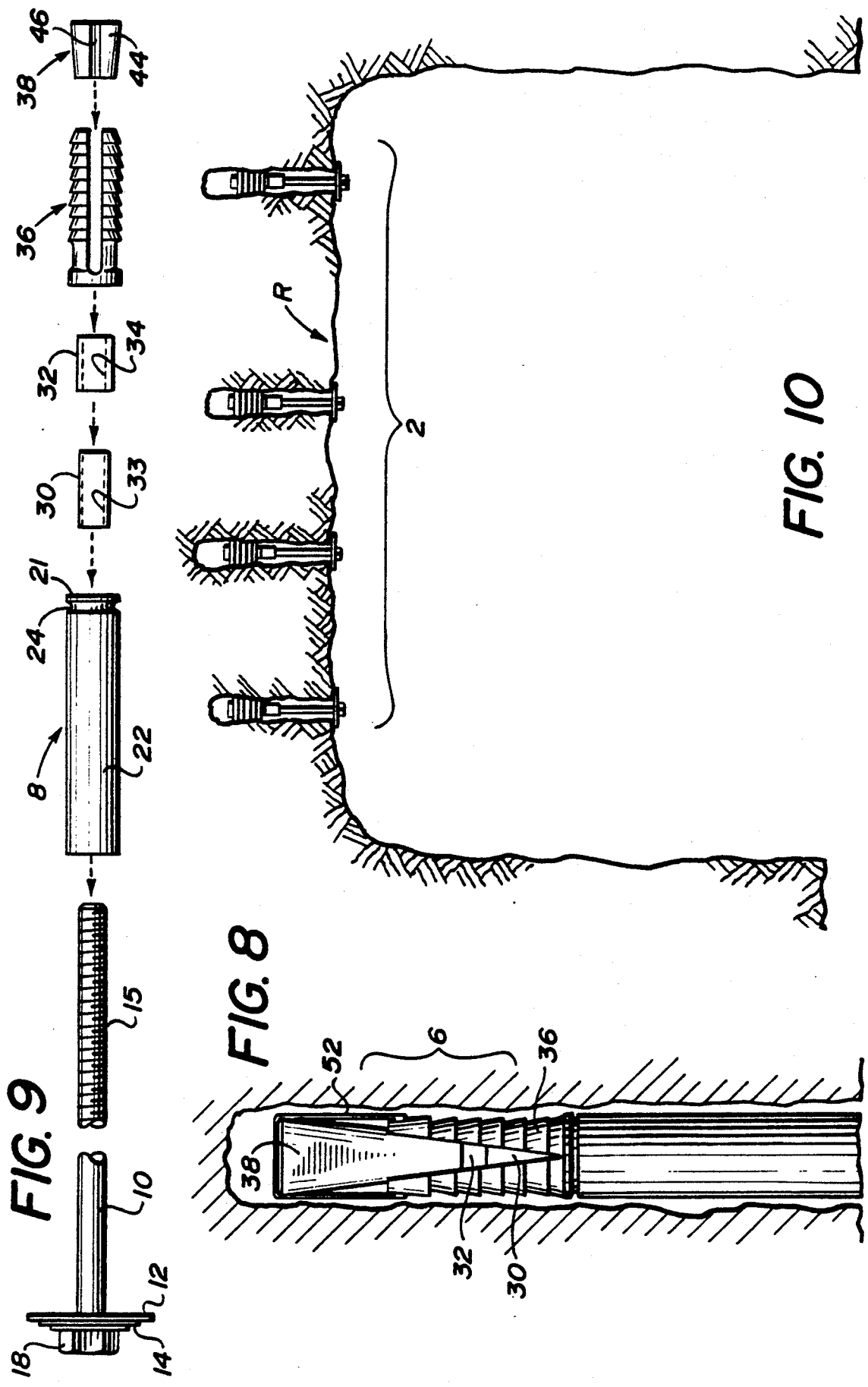

METHOD AND APPARATUS FOR RETORQUING AN INSTALLED MINE ROOF BOLT

FIELD OF THE INVENTION

The present invention relates to anchor assemblies for securing a conventional mine roof-bolt assembly under tension to a competent substrate. More specifically, the instant invention pertains to anchor assemblies implementing both a mechanical anchoring unit and resin bonding for securing a tensioned bolt to a substrate.

BACKGROUND OF THE INVENTION

The dangers inherent in unreinforced or improperly reinforced underground passageways, mines and the like are well documented. Various anchor assemblies have been used to reinforce underground passageways, mines and the like to minimize the hazards associated therewith. Well known anchor assemblies include full column resin systems, mechanical expansion systems and combined resin-mechanical expansion systems. The present invention pertains to those anchor assemblies using both a resin bonding element and a mechanical expansion unit. Accordingly, the following discussion will be directed to anchor assemblies of this type.

Generally, these systems include a two compartment cartridge consisting of a resin and a catalyst and an anchor assembly threaded on a bolt. An example of such an assembly is disclosed in U.S. Pat. No. 4,664,561 assigned to the assignee of the present invention. The anchor assembly therein includes a bearing plate resting on the head of the bolt and a mechanical expansion unit threaded onto the opposite end thereof. Conventional, mechanical expansion units include a camming plug and an expandable shell. Further, a bail or threaded support nut is used in conjunction with the mechanical expansion unit to support the expandable shell during installation of the bolt. The two compartment cartridge is inserted into a bore hole formed in the substrate followed by the anchor assembly threaded on a bolt. Once the resin cartridge is punctured by the insertion of the anchor assembly, the resin and the catalyst flow downwardly, mix and surround the same.

The mechanical expansion unit is activated by rotating the bolt to draw the camming plug downwardly for thereby forcing the fingers of the expandable shell into engagement with the wall of the substrate. In this manner, the bolt is rotatably secured to the substrate. The bolt is further supported in the bore hole of the substrate by the resin when hardened.

After the shell has been expanded, further rotation of the bolt causes the camming plug to be drawn down into the expansion shell and thereby create tension in the bolt shank. This forces the bearing plate against the roof of the substrate and to compress the competent strata into a beam. This procedure significantly improves the load bearing characteristics of the roof of the substrate. The tensile force on the bolt must be maintained to ensure that the strata is adequately compressed. It is desirable to determine the tensile force on the bolt at various time intervals after installations, although, conventional combined resin-mechanical anchor assemblies have been unable to do this on a cost effective basis.

It is well known that a functional relationship exists between the torque and tensile forces on a bolt. Thus, the tensile force on the bolt can be readily determined from the torque. In previously known combined resin-mechanical anchor assemblies, the resin surrounds the bolt shank as well as the threaded end portion and becomes embedded in the grooves of the threads. Once the resin hardens, it restricts the rotational movement of the bolt. Therefore, values for the torque on the bolt obtained subsequent to the hardening of the resin are not possible. There is a direct torsional relationship between the bolt, resin and bore hole wall. Conventional torque measurements produce "spring back" or twisting of that portion of the bolt shank not in contact with the resin bond.

OBJECTS AND SUMMARY OF THE INVENTION

An object of the present invention is to provide an improved combined resin-mechanical bolt anchor assembly eliminating the aforementioned disadvantages of conventional systems.

Another object of the present invention is to provide an accurate method for determining the tension on a bolt anchored to a substrate by a combined resin-mechanical anchor assembly once the resin has hardened.

A further object of the present invention is to provide a combined resin-mechanical bolt anchor assembly that can be inexpensively and readily manufactured.

Still a further object of the present invention is to provide a combined resin-mechanical bolt anchor assembly that can be readily retorqued if any decrease in the tension on the bolt is detected subsequent to the hardening of the resin.

Yet another object of the instant invention is to provide a combined resin-mechanical anchor assembly that freely permits rotation of the bolt once the resin has hardened.

These and other objects of the present invention will be readily understood from the following detailed description of the preferred embodiments.

In summary, the present invention is directed to an anchor assembly for installing a threaded roof bolt under tension in a bore hole formed in underground passageways, mines, and the like. The anchor assembly includes a conventional two compartment resin cartridge and a mechanical expansion unit. A support collar is threaded on the bolt to restrict axial movement of the mechanical expansion unit. The mechanical expansion unit includes a camming plug and an expandable shell. A pair of hollow tubular sleeves are positioned intermediate the camming plug and the support collar to prevent the resin from embedding in the grooves of the threads of the bolt. Accordingly, the bolt is free to rotate relative to the substrate.

BRIEF DESCRIPTION OF THE DRAWINGS

FIG. 4 is an enlarged cross-sectional view of the mechanical expansion unit illustrated in FIG. 2.

FIG. 5 is an enlarged cross-sectional view of the mechanical expansion unit depicted in FIG. 3.

FIG. 6 is an enlarged cross-sectional view of a first alternative embodiment of the present invention.

FIG. 7 is an enlarged cross-sectional view of the alternative embodiment depicted in FIG. 6 with the mechanical expansion unit fully engaged with the sidewall of the bore hole.

FIG. 8 is a fragmentary elevational view of a second alternative embodiment of the present invention.

FIG. 9 is an exploded view of the embodiment depicted in FIGS. 1 through 5.

FIG. 10 depicts several combined resin-mechanical bolt anchor assemblies of the present invention installed in the roof of an underground passageway, mine or the like.

DETAILED DESCRIPTION OF THE INVENTION

The preferred embodiments of the present invention will hereinafter be described.

FIGURES 1 THROUGH 5 AND 9

Figure 1:
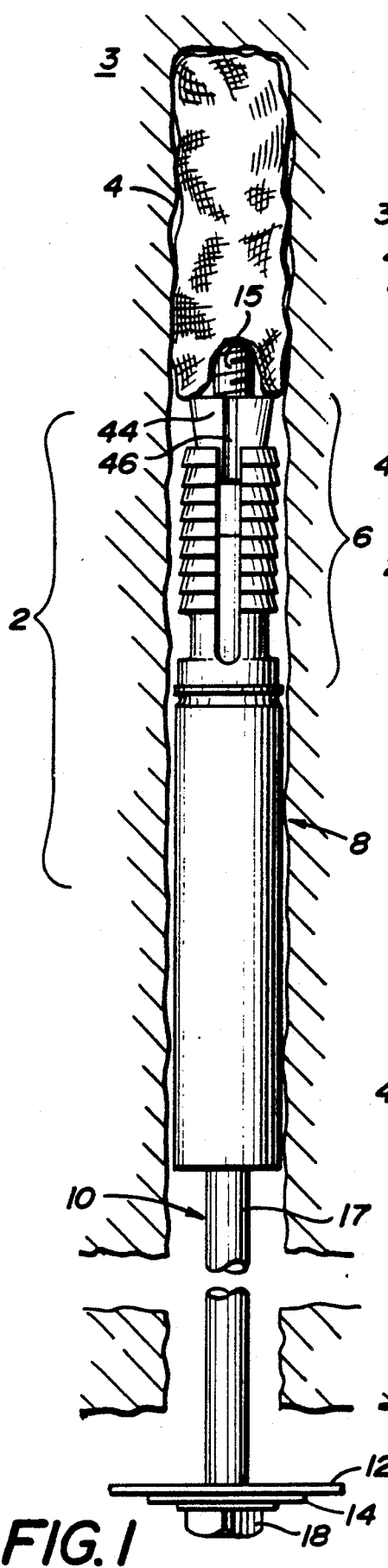
FIG. 1 is a fragmentary elevational view of the combined resin-mechanical bolt anchor assembly of the present invention partially inserted into a bore hole of a substrate.

Referring to FIG. 1, a combined resin-mechanical bolt anchor assembly 2 includes a conventional two compartment resin cartridge 4, a mechanical expansion unit 6, a support collar 8, a threaded bolt 10, a bearing plate 12 and a washer 14. Bolt 10 includes threads 15 formed in the upper end thereof, a shank 17 and a head 18. Bearing plate 12 and washer 14 each contain openings for receiving the bolt 10 and are positioned to rest on head 18 thereof.

Figure 2:
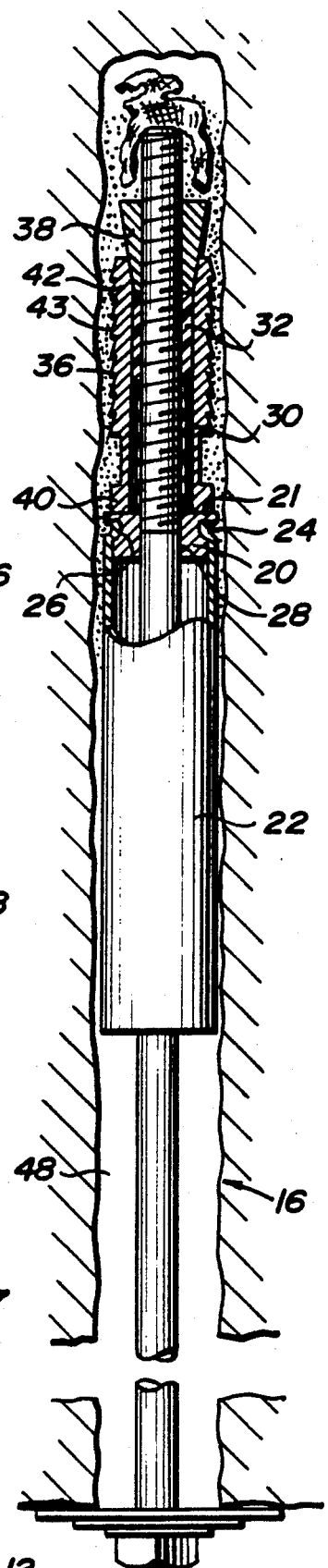
FIG. 2 is a fragmentary elevational view of the anchor assembly of the present invention completely inserted in the bore hole with the resin cartridge ruptured.

As best seen in FIGS. 2 and 4, the support collar 8 includes an insert 20 and a hollow tube 22. The insert 20 includes a machined surface 21 and a threaded opening 28 extending therethrough. The hollow tube 22 is crimped at its upper end to secure it to insert 20. As a result of this process, an annular, substantially arcuate flange 24 is formed in the upper end of the hollow tube 22. Further, a corresponding annular, substantially arcuate recess 26 is formed in the insert 20.

Prior to insertion of bolt 10 into bore hole 16, the support collar 8 is threaded onto the lowermost section of threads 15. Subsequently, a thin-walled tubular sleeve 30 is slid over threads 15 and positioned adjacent the support collar 8, as shown in FIG. 4. A thick-walled tubular sleeve 32 is slid over the bolt 10 and positioned directly above and in abutting engagement with the upper surface of thin-walled tubular sleeve 30. Sleeves 30 and 32 can be formed from steel, cardboard, plastic, paper or any material having minimal column strength. The sleeves 30 and 32 are, preferably, manufactured from low density polyethylene. The tube 30 has a wall thickness of about 0.010 inches, while the sleeve 32 has a wall thickness of about 0.025 inches. The inner diameters of sleeves 30 and 32 are equal to or greater than the diameter of bolt 10. Accordingly, the inner surfaces 33 and 34 of sleeves 30 and 32, respectively, do not engage the grooves of threads 15. The sleeve 32 is however, on the order of twice the thickness of sleeve 30.

The mechanical expansion unit 6 includes an expandable shell 36 and an internally threaded camming plug 38. The expandable shell 36 includes a collar 40 and a plurality of longitudinally extending serrated fingers 42. The fingers 42 extend outwardly from collar 40. Fingers 42 further include a plurality of teeth 43 for engaging the sidewall 48 of bore hole 16. The camming plug 38 includes a plurality of tapered camming faces 44 and recesses 46, shown in FIG. 1, disposed intermediate the tapered faces 44. The mechanical expansion unit 6 is positioned on the threaded bolt 10 such that the internal threads of camming plug 38 engage threads 15 and camming faces 44 are aligned with longitudinally extending fingers 42. Further, collar 40 of expandable shell 36 abuts support collar 8. Camming plug 38 and support collar 8 prevent the expandable shell 36 from moving along the axis of bolt 10.

Figure 3:
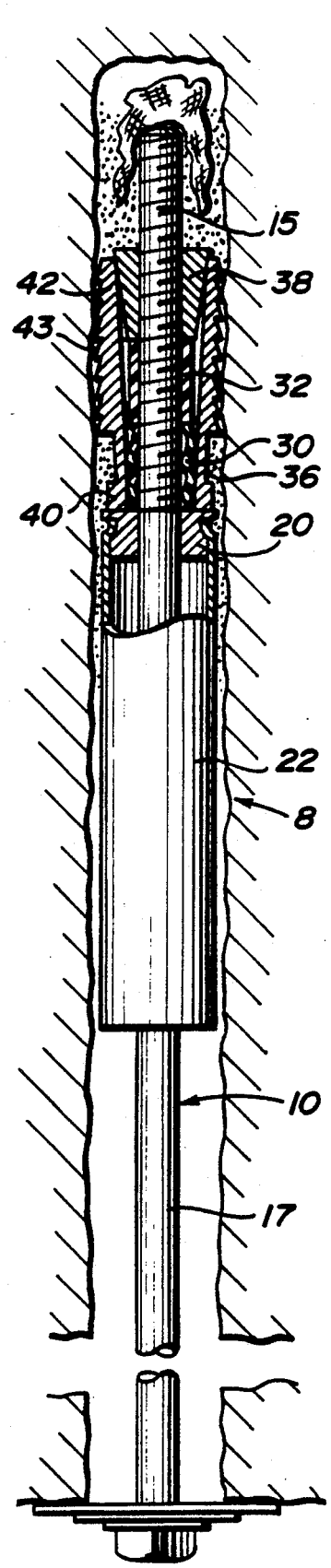
FIG. 3 is a fragmentary elevational view of the anchor assembly of the present invention with the mechanical expansion unit fully engaged with the sidewall of the bore hole.

As the bolt 10 is inserted into the bore hole 16, the bearing plate 12 abuts the roof of the substrate and the two compartment resin cartridge 4 is ruptured. The cartridge components flow around the anchor assembly 2 and extend as far down as the lower end of the support collar 8. The sidewall 48 of bore hole 16 engages the outer and uppermost portions of at least one of the fingers 42 to prevent the expandable shell 36 from rotating with the bolt 10. Thus, by rotating the bolt 10, the camming plug 38 is essentially immediately drawn downwardly into the expandable shell 36 for thereby forcing fingers 42 outwardly into the sidewall 48 of the bore hole 16 (See FIGS. 3 and 5).

The column strength of the thick-walled sleeve 3 is significantly greater than that of thin-walled sleeve 30. Accordingly, the downward movement of the camming plug 38 in turn forces the thick-walled tubular sleeve 32 downwardly for thereby collapsing thin-walled sleeve 30. The collar 40 and the expandable fingers 42 are removed from the outer surface of the bolt 10 a distance sufficient to permit the thin-walled tubular sleeve 30 to collapse without engaging the grooves of threads 15. Also, sleeve 32 is of sufficient thickness to prevent either it or sleeve 30 from being extruded into the threads of camming plug 38.

Since the support collar 8 is positioned at the lowermost end of threads 15 prior to insertion of assembly 2 in bore hole 16, collar 8 is prevented from rotating relative to the bolt 10 upon initial tightening thereof. The rotation of the support collar 8 with bolt 10 mixes the cartridge components and forces the mixture into crevices formed in the sidewall 48 of the bore hole 16. However, as the camming plug 38 is forced downwardly along the longitudinal axis of bolt 10, the expandable shell 36 is forced against the face 21 of insert 20 thereby increasing the frictional force therebetween. Once the camming plug 38 has moved downward to the point where the shell 36 is fully expanded into the strata 3, the frictional force between the expandable shell 36 and support collar 8 is sufficient to prevent the collar 8 from rotating with the tension bolt 10. Thus, further tightening of the bolt 10 moves the same upwardly in bore hole 16 a sufficient distance that threads 15 are no longer in engagement with the threads of insert 20. The bearing plate 12 simultaneously moves upwardly with bolt 10 and compresses the competent strata of the substrate 3 to form a beam. The surface 21 is machined sufficiently to allow relative movement between the expandable shell 36 and support collar 8 and subsequently to restrict relative movement therebetween once the expansion unit 6 is fully engaged.

As the support collar 8 moves off the threads 15, the corresponding threads of insert 20 are deformed. Therefore, the support collar 8 is no longer coupled to the tensioned bolt 10. The resin mixture in the bore hole 16 prevents the support collar 8 from sliding along the longitudinal axis of bolt 10. The support collar s and the mechanical expansion unit 6 are fixed, i.e. not rotatable relative to the sidewall 48 of the bore hole 16 once the resin mixture hardens. The tubular sleeves 30 and 32 prevent the resin from engaging the threads 15 intermediate the camming plug 38 and the support collar 8, and are of sufficient thickness to prevent the resin mixture from deforming the sleeves 30 and 32 by an amount permitting the resin mixture to be grooved by the threads. Accordingly, the only portion of the threaded bolt 10 exposed to the resin mixture is that end which extends above the upper surface of the camming plug 38. However, the bonding characteristics of any resin that might be present in the uppermost part of the bore hole 16 are generally negligible. Therefore, the bolt 10 can be rotated in bore hole 16 subsequent to hardening of the resin.

The harden resin forms in the annular, substantially arcuate flange 24 and around the body portion of the hollow tube 22 and restricts the rotational and vertical movement of the support collar 8 in the bore hole 16 of the substrate 3. Accordingly, collar 8 further supports the bolt 10 in the bore hole 16.

Since the sleeves 30 and 32 prevent the resin mixture from contacting the threads between plug 38 and surface 31, the bolt 10 may be rotated after the mixture hardens. Additionally, because of the thickness of sleeves 30 and 32, they will not be sufficiently deformed radially to allow the resin mixture to, in essence, form threads about threads 15 which would prevent rotation of bolt 10. Since bolt 10 may be rotated relative to plug 38 subsequent to hardening of the resin mixture, then a torque reading may be taken as a means for monitoring the load on the bolt.

FIGS. 6 AND 7

FIGS. 6 and 7 illustrate an alternative embodiment of the present invention. The combined resin-mechanical anchor assembly of this embodiment includes all the features disclosed in the embodiment illustrated in FIGS. 1 through 5 and 9 and an additional U-shaped sleeve 50 mounted above the camming plug 38. As previously stated, any existing resin in the upper portion of bore hole 16 usually has negligible bonding characteristics. However, in those instances where resin in the upper area of bore hole 16 may exert a bonding force on bolt 10, a substantially U-shaped sleeve 50 can be mounted above camming plug 38 to prevent the resin from restricting relative movement between the bolt 10 and the sidewall 48 of bore hole 16. The U-shaped sleeve 50 extends above camming plug 38 a sufficient distance to accommodate the relative vertical movement between the bolt 10 and camming plug 38 as the combined resin-mechanical anchor assembly 2 is installed in the bore hole 16 (see FIG. 7). The embodiment disclosed in FIGS. 6 and 7 is installed in the same manner as the first embodiment.

FIG. 8

FIG. 8 illustrates a third embodiment of the present invention. The mechanical expansion unit 6, the support collar 8 and sleeves 30 and 32 are similar to those disclosed in the previous embodiments. In this embodiment, a conventional bail 52 supports the mechanical expansion unit 6 on threaded bolt 10. The anchor assembly according to this embodiment is installed in the same manner as the embodiments depicted in FIGS. 1 through 7 and 9.

METHOD FOR TESTING THE TENSION ON INSTALLED MINE ROOF BOLT ANCHOR ASSEMBLIES

Referring to FIG. 10, a plurality of combined resin-mechanical anchor assemblies 2 are inserted into bore holes formed in the roof R of an underground passageway, mine or the like. The bolts 10 associated with the assemblies 2 are initially placed under tension to compress the competent strata of roof R to reinforce the same. However, the bolts 10 should be maintained under tension to properly reinforce the roof R. Therefore, it is necessary to determine the tensile load on the bolts 10 at various times subsequent to installation. In this regard, it is well known that a functional relationship exists between the torque on a bolt and the tensile force exerted thereon. Thus, by measuring the torque on the bolt, with a torque wrench or the like, at any given time, one can readily determine the tension exerted thereon. This was conventionally done in anchor assemblies having only a mechanical expansion unit.

In prior combined resin-mechanical anchor assemblies, the resin surrounds the tensioned bolt and fixes it to the sidewall of the bore hole. Accordingly, any torque readings on the bolt subsequent to the hardening of the resin would not accurately reflect the tension load on the bolt, since the resin would prevent rotation of the bolt relative to the substrate. Therefore, it has not been possible to employ a torque wrench or the like in known combined resin-mechanical anchor assemblies to determine the tension exerted on a bolt. The present invention enables an operator to readily and accurately determine the tension exerted on a bolt after hardening of the resin by employing a torque wrench and the like. Specially, the operator uses a torque wrench to measure the torque on the bolts 10 in the roof R of the substrate at the time of installation thereof (see FIG. 10). The operator can readily determine the initial tensile load exerted on the bolts 10 from the initial torque reading. This value will hereinafter be referred to as the installation tensile force. Sometime after the resin hardens, the operator again measures the torque on the bolts 10 using a torque wrench or the like and determines the tensile force therefrom. If the tension load exerted on the bolt after hardening of the resin has decreased greater than a predetermined amount from the installation tensile force, the operator may tighten the bolt 10 to increase the tensile force thereon causing the corresponding bearing plates 12 to compress the competent strata. If the tensile load exerted on the bolt after hardening of the resin has increased to exceed a predetermined amount, the operator, where appropriate, will employ additional means to reinforce the passageway, mine or the like. It will be readily understood that the operator can check only a percentage, rather than all of the installed anchor assemblies, to ensure that the bolts associated therewith are properly tensioned.

Applicants' invention is a significant improvement over existing combined mechanical-resin anchor assemblies. Specifically, the present invention provides a cost effective method for accurately determining the tensile force on a bolt after hardening of the resin. Furthermore, it obviates the need for the use of additional reinforcing devices where those anchor assemblies initially installed are no longer exerting adequate force on the competent strata.

It is to be understood that the invention is not to be limited to the preferred embodiments recited above, as obvious modifications and equivalents will be apparent to one skilled in the art.

We claim:

1. An anchor assembly operably associated with a bore hole formed in a substrate for anchoring a tensioned bolt to the substrate, the tensioned bolt having a threaded portion at one end thereof, comprising:
   a) mechanical expansion means for mechanically anchoring a tensioned bolt to a substrate, said mechanical expansion means having upper and lower surfaces;
   b) bonding surface, operably associated with said mechanical expansion means, for being bonded to a substrate by a resin bonding means; and,
   c) anti-bonding means, operably associated with said mechanical expansion means, for preventing the resin bonding means from bonding at least a portion of the tensioned bolt to the substrate and thereby permitting relative rotation between the bolt and said mechanical expansion means, said anti-bonding means having a first flexible member, at least a portion of said first flexible member extends between said upper and lower surfaces of said mechanical expansion means.

2. An anchor assembly operably associated with a bore hole formed in a substrate for anchoring a tensioned bolt to the substrate, the tensioned bolt having a threaded section including a plurality of threads at one end thereof, comprising:
   a) mechanical expansion means for mechanically anchoring a tensioned bolt to a substrate;
   b) bonding surface, operably associated with said mechanical expansion means, for being bonded to a substrate by a resin bonding means; and
   c) anti-bonding means for preventing the resin bonding means from bonding at least a portion of the threaded section of the tensioned bolt to the substrate, said anti-bonding means having an inner and an outer diameters and said inner diameter being positioned removed from the grooves of the threads of the bolt when the mechanical expansion means is fully engaged.

3. An anchor assembly of claim 2, wherein
   a) said mechanical anchoring means includes a camming means and an expandable shell means.

4. An anchor assembly of claim 3, wherein
   a) said bonding surface is formed on a collar means, said collar means including a support surface operably associated with said mechanical expansion means for vertically supporting said expandable shell means.

5. An anchor assembly of claim 4, wherein
   a) said anti-bonding means is adapted to be positioned between said camming means and said collar means.

6. An anchor assembly of claim 5, wherein
   a) said anti-bonding means includes first and second members, said second member having a column strength greater than said first member.

7. An anchor assembly as in claim 6, wherein
   a) said second member is adapted to be positioned adjacent said camming means and said first member is adapted to be positioned removed therefrom;
   b) said camming means includes a threaded opening extending therethrough; and
   c) said second member further includes means for preventing said second member and said first member from engaging said threaded opening of said camming means.

8. An anchor assembly as in claim 7, wherein
   a) said first and second members ar hollow tubes, said second member having a thickness greater than said first member.

9. An anchor assembly as in claim 1, wherein
   a) said first flexible member is adapted to be compressible along a longitudinal axis of the tensioned bolt.

10. A support apparatus for a combined resin-mechanical anchor assembly operably associated with a bore hole formed in a substrate for anchoring a tensioned bolt to the substrate, the tensioned bolt having a threaded portion at one end thereof, said support apparatus comprising:
    a) insert means having first and second sections, said first section having a diameter greater than said second section, said first section further including a support surface for supporting a mechanical expansion means which couples a tensioned bolt to the substrate, said insert means further including a threaded opening extending through said first and second sections;
    b) a body member including a hollow cavity, an inner surface, an outer surface, and an upper surface, said outer surface adapted to be bonded to the substrate by a resin bonding means;
    c) said second section of said insert means being adapted to extend into said hollow cavity of said body member; and
    d) securing means for securing said insert means to said body member.

11. A support apparatus as in claim 10, wherein
    a) said securing means includes a substantially arcuate flange formed in an upper section of said body member and a corresponding substantially arcuate recess formed in said second section of said insert means.

12. A support apparatus as in claim 11, wherein
    a) said arcuate flange and said arcuate recess are annular.

13. A support apparatus as in claim 10, wherein
    a) said inner surface is removed from the tensioned bolt to permit relative rotation between the tensioned bolt and said body member.

14. An apparatus as in claim 10, wherein said support surface is machined to facilitate relative rotation between the mechanical expansion member and said insert means.

15. A method for installing a tensioned bolt in a substrate and accurately measuring the tension force exerted on the bolt at subsequent time intervals, comprising the steps of:
    a) forming a bore hole in the substrate;
    b) providing resin bonding means in a container means and inserting the container means in the bore hole;
    c) providing an anchor assembly including a bolt having at least a first threaded end, a mechanical expansion means for rotatably coupling the bolt to the substrate, and an anti-bonding means for preventing the resin bonding means from fixing at least a portion of the bolt to the substrate;
    d) inserting the anchor assembly into the bore hole for puncturing the container means thereby permitting the adhesive bonding means to flow therefrom;

e) activating the mechanical expansion means thereby rotatably coupling the bolt to the substrate;
f) torquing the bolt to an initial predetermined value;
g) permitting the resin bonding means to harden to fix at least a portion of the bolt to the substrate;
h) rotating the bolt to measure the torque thereon at least a first time subsequent to the hardening of the adhesive means.

16. The method of claim 15, furthering including the steps of:
a) retorquing the bolt if the value of torque obtained from the subsequent measuring step is a predetermined amount lower than the initial torque value for the bolt.

17. The method of claim 15, further including the step of:
a) providing additional reinforcing means to reinforce the substrate if the value of the torque obtained from the measuring step is a predetermined amount higher than the initial torque value for the bolt.

18. An anchor assembly operably associated with a bore hole in a substrate for anchoring a tensioned bolt to the substrate, the tensioned bolt having a threaded portion at one end thereof, comprising:
a) mechanical expansion means for mechanically coupling the threaded portion of the tensioned bolt to the substrate, said mechanical expansion means including a camming means and an expandable shell means each having inner and outer diameters;
b) a bonding surface being adapted to be bonded to the substrate by a resin bonding means; and
c) anti-bonding means for preventing the resin bonding means from bonding at least a portion of the tensioned bolt to the substrate; said anti-bonding means having inner and outer diameters said inner diameter of one of said camming means and said expandable shell means being greater than said outer diameter of said anti-bonding means.

19. An anchor assembly operably associated with a bore hole in a substrate for anchoring a tensioned bolt to the substrate, the tensioned bolt having a threaded portion at one end thereof, comprising:

a) a mechanical expansion means for mechanically coupling the tensioned bolt to the substrate; and
b) a collar means for supporting said mechanical expansion means along an axis of the bolt, said collar means including a bonding surface for being bonded to the substrate by a resin bonding means, said collar means further including an annular recess formed therein for receiving the resin bonding means.

20. An apparatus operably associated with a resin bonding means for reinforcing an underground passageway and the like, comprising:
a) a bolt having a head, a threaded section and a shank section;
b) a substantially cylindrical tube means threaded on said bolt and positioned adjacent said shank section;
c) a mechanical expansion means mounted about said bolt, said mechanical expansion means including a camming plug and an expandable shell having an inner surface, said camming plug being threaded on said bolt and positioned removed from said shank section, said expandable shell being positioned between said camming plug and said cylindrical tube means; and
d) a collapsible sleeve for preventing a resin bonding means from engaging at least a portion of said threaded section, said sleeve extending along at least a portion of said expandable shell intermediate said camming plug and said cylindrical tube means.

21. An apparatus as in claim 20, wherein
a) said sleeve means includes first and second hollow tubes, said first hollow tube being positioned adjacent said camming plug and said second hollow tube being positioned adjacent said cylindrical tube means, said first hollow tube having a thickness substantially greater than said second hollow tube.

22. An apparatus as in claim 21, wherein
a) said second hollow tube has a length greater than said first hollow tube.

23. An apparatus as in claim 22, wherein
a) said first hollow tube has a column strength greater than said second hollow tube.

* * * * *